(12) United States Patent
Martínez Reol et al.

(10) Patent No.: US 8,774,599 B2
(45) Date of Patent: Jul. 8, 2014

(54) METHOD FOR TRANSCODING AND PLAYING BACK VIDEO FILES BASED ON GRID TECHNOLOGY IN DEVICES HAVING LIMITED COMPUTING POWER

(75) Inventors: Álvaro Martínez Reol, Madrid (ES);
Santiago Prieto Martín, Madrid (ES);
David Artuñedo Guillén, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 13/580,074

(22) PCT Filed: Feb. 22, 2010

(86) PCT No.: PCT/ES2010/070096
§ 371 (c)(1),
(2), (4) Date: Nov. 20, 2012

(87) PCT Pub. No.: WO2011/101507
PCT Pub. Date: Aug. 25, 2011

(65) Prior Publication Data
US 2013/0058634 A1 Mar. 7, 2013

(51) Int. Cl.
*H04N 5/92* (2006.01)
(52) U.S. Cl.
USPC .......................................... 386/248; 386/239
(58) Field of Classification Search
None
See application file for complete search history.

(56) References Cited

U.S. PATENT DOCUMENTS

2007/0180451 A1* 8/2007 Ryan et al. .................... 718/104
2007/0294697 A1* 12/2007 Theimer et al. ............... 718/102
2009/0147840 A1* 6/2009 Sahdra et al. ............ 375/240.01

OTHER PUBLICATIONS

International Search Report dated Oct. 21, 2010 issued in corresponding international patent application No. PCT/ES2010/070096.
Information Society Technologies, XtreemOS Integrated Project No. IST-033576 for "Building and Promoting a Linux-Based Operating System to Support Virtual Organizations for Next Generation Grids—D3.6.4 Requirements and Specification of Advanced Services for Mobile Devices"; pp. 1-28, Jun. 24, 2009.
Morin, Christine, "XtreemOS: A Grid Operating System Making Your Computer Ready for Participating in Virtual Organizations", pp. 1-10, 2007.

* cited by examiner

*Primary Examiner* — William C Vaughn, Jr.
*Assistant Examiner* — Eileen Adams
(74) *Attorney, Agent, or Firm* — Ostrolenk Faber LLP

(57) ABSTRACT

The present disclosure relates to the production of an application for transcoding video files for devices having limited computing power by means of using a grid computing platform. The platform offers storage space for the user (making use of the distributed storage capacity of the GRID platform and its own security mechanisms) where both the original video and the transcoded video will be stored. The solution also provides the device with middleware with GRID capacities in order to achieve complete GRID integration. That means that the transcoding application could either be run directly in the terminal or in the GRID.

9 Claims, 2 Drawing Sheets

METHOD FOR TRANSCODING AND PLAYING BACK VIDEO FILES BASED ON GRID TECHNOLOGY IN DEVICES HAVING LIMITED COMPUTING POWER

CROSS REFERENCE TO RELATED APPLICATIONS

The present application is a 35 U.S.C. §371 National Phase conversion of PCT/ES2010/070096, filed Feb. 22, 2010, the disclosure of which is incorporated herein by reference. The PCT application was published in the Spanish language.

TECHNICAL FIELD

As expressed in the title of this specification, the present invention relates to a method for transcoding and playing back video files based on distributed computing network (GRID) technology in devices having limited computing power making use of the computing and distributed storage capacities offered by GRID platforms in the devices, such that said devices are capable of playing back any type of digital video file. To that end, the GRID will be responsible for running a transcoding application when necessary in order to transcode the original video file. This task will be carried out in a manner which is transparent to the user in one of the computing resources available in the GRID. Likewise, the video file to be played back can be located in the GRID user file system or can be external to the terminal, but accessible as if it were local as long as the terminal maintains the connection with the network. This invention also allows the video file to be provided by an external multimedia content provider. The link between the application and the GRID is possible as a result of the existence of middleware installed in the operating system of the terminal, therefore turning it into a general purpose application based on the GRID system for converting video and playing it back.

The fields of application of this invention are distributed computing as well as multimedia content playback.

BACKGROUND ART

There are two starting points to approach this invention. On one hand, the increase in the number of mobile devices (and other multimedia devices having limited computing power) capable of playing back multimedia contents, and on the other hand, the already existing distributed computing network (known as GRIDs).

Focusing on the first point, new mobile devices (smartphones, PDAs, etc.) are increasingly designed with displays having greater resolution and better video playback performance.

However, there is a trend of recording very high resolution videos (even in high definition) or using compressed formats requiring a significant processing capacity in order to achieve a smooth playback and strongly limiting the video playback possibilities offered by current devices. For example, there are few mobile telephones which support the DivX codec, one of the most widespread on the Internet for video distribution. As a result, the content providers or the users themselves are forced to convert the content to enable playing it back on their terminals. To that end, there are several options, but generally some hardware and an application external to the terminal is needed such as:

The user can use a local DLNA server with direct access to the video file source for carrying out the conversion, while the DLNA client application which must be run in the terminal receives and plays back the content.

The content provider itself could be responsible for converting the original video for generating a converted copy suitable for the specific needs of the user terminal.

In this line of creating copies of content, the provider or the user could use a web service exclusively intended for conversion provided by a third party. This third party could in turn use the infrastructures supplied by a cloud computing provider, such as Amazon EC2, for example, in order to perform costly video conversions. However, this option is more content provider orientated and, in any case, the original file must be sent to the third party, the converted video being recovered later on. This process consumes a large bandwidth and having this bandwidth is not always possible for the end users.

Changing the focus towards distributed computing networks, the GRID platforms have been mainly used for intensive computing tasks (complex scientific calculations for industrial simulations). However, until the arrival of cloud computing, there were not many commercial initiatives offering computing capacities for the end users from their own devices. Today there are products such as Amazon® EC2 or Google® App Engine which allow contracting a specific amount of remote computing power.

On the other hand, the XtreemOS project financed by the European Commission under the $6^{th}$ Framework Programme allows easy and harmonious integration with the GRID platforms. In fact, one of the specific research lines of XtreemOS focuses on accessing the GRID platforms from mobile devices, offering the end users the capacities offered by GRID computing. The present invention thus focuses on exploiting the native capacities of GRID platforms from devices with a limited computing power in order to transcode video in the GRID, taking into account that those tasks related to video conversion (format, resolution, etc.) require high computing power not usually available on the user terminals such as mobile telephones, PDAs, etc.

Converting average or high quality videos using codecs such as DivX, Xvid or H.264 is a high consumption process in terms of processing, memory and storage space. Many devices with limited computing power (such as mobile telephones, PDAs, portable multimedia devices, etc.) are not intended for carrying out this conversion either because they do not have enough capacity or the time necessary for the conversion is too long, or even because the battery consumption would be excessive for such terminals. Given that the computing capacity of the equipment continues to grow year after year, it is difficult to quantify what is understood by limited computing capacity, but it can be considered that the computing capacity is limited when the equipment in question is capable of performing a number of instructions per second which is at least one order of magnitude below what a mid-range personal computer would be capable of performing. For example, currently a mid-range PC tends to be equipped with Core 2 Duo processors, with a performance of the order of tens of thousands of MIPS (millions of instructions per second). In turn, a current mobile terminal, such as the Nokia® N800 Tablet PC for example, is equipped with a processor from the ARM11 family with a processing capacity less than one thousand MIPS.

On the other hand, many of those devices are equipped with some type of data interface, such as Wi-Fi or 3G, and have relatively advanced operating systems installed. Furthermore, they incorporate some video play back applications and video codecs which are run directly in the terminal itself. The video source can be local or is downloaded and played back from an external source by means of streaming techniques.

But in any case, the playback is only possible if the video is coded with one of the codecs supported by the terminal. If not, the video must be transcoded into a suitable format if the terminal has an application specifically designed to that end, but even in this case, carrying out the transcoding in the same terminal would not be advisable given the following situations:

i) the video source is not local,
ii) the user does not want to consume the limited resources of its terminal.

Other solutions based on Web services provided by third parties (such as the online video file conversion service, flixcloud, for example,) attempt the prior installation of the conversion application in the Web server and use a Web interface which will not always be the native interface of the operating system of the terminal, forcing the applications of the terminal to be modified. Modifying the application would be less complex or would not even be necessary with a solution based on middleware with GRID capacities.

SUMMARY

The present invention proposes a solution for this limitation by means of running a transcoding application in a grid computing platform. Furthermore, the platform will offer storage space for the user (making use of the distributed storage capacity of the GRID platform and its own security mechanism) where both the original video and the converted video will be stored. The solution also provides the terminal with middleware with GRID capacities in order to achieve complete grid integration. That means that the transcoding application could either be run directly in the terminal or in the GRID.

Two different application scenarios of the present invention are distinguished. In scenario 1, the original video file is previously stored in the GRID distributed file system, the user being able to access it as if it were a local file of his/her device. This is possible as a result of the native running of a GRID file system in the user terminal. In scenario 2, the video file is sent to the GRID through an external content provider, such that in this case the user does not have direct access to the original video file.

The method solving both scenarios comprises the following steps:

1. The client part of the multimedia transcoder/player selects a video file to be played back. A user interface is provided to that end. In scenario 1, the file is stored in a file system provided by the GRID, where the user has access similar to that of a local file. Then, the user will only have to select the file to be played back. In scenario 2, where the user does not have direct access to the file, the user will indicate its location by a Uniform Resource Locator, URL. In both cases, the user must be previously registered in the network, such that there will be a secure communication mechanism between the network and the user terminal, based on the specific integrity and security mechanisms of the GRID. Furthermore, in both cases, the client part of the multimedia transcoder/player will provide the user with the possibility of selecting the desired quality for converting video which will be played back from among the possible codec and resolution options supported by the terminal. There will be a default option and it will generally be the optimum option in terms of playback quality for the given terminal.

2. The multimedia transcoding/play back application will use the capacities to run processes in the GRID offered by the GRID middleware of the terminal. The client part of the multimedia transcoder/player will thus send a video conversion process to the GRID. When said process is run in the GRID the access path to the application responsible for the transcoding as well as the access path to the local file source (scenario 1) or the URL address of the remote file (scenario 2) and the necessary parameters will be indicated depending on the playback quality selected in the prior step. Once the transcoding task is started in any of the computing resources of the GRID, in scenario 1, the existence of a file in the selected path will be verified, whereas in scenario 2 the downloading of the file indicated by means of the URL and its storage in the GRID file system will start.

3. The specific transcoding part of the process sent to the GRID will be run according to the quality parameters desired and specified in step 1. In scenario 1, running the process will generate a transcoded video file which will be stored in the GRID user file system, to which the user will have access. Once the storing of the converted video ended and the GRID connector module detected the end of the process, an end of process notification is sent to the client part of the multimedia transcoder/player and from that moment the application of the client will be able to play back said transcoded video file. In scenario 2, since the video is being transcoded in the GRID it will be sent to the terminal by means of conventional streaming techniques such that the video can be played back at the same time that it is transcoded.

The object of the invention which is a method and a system for transcoding and playing back video files based on GRID technology in devices having limited computing power can thus be defined in a more detailed manner.

A multimedia transcoding/play back application and GRID middleware integrated in the user device will be previously provided. Said method is characterised in that it comprises the following phases:

providing the device with a user interface for selecting a video file through the transcoding/play back application;

verifying that the user is registered in the GRID by means of the GRID middleware and establishing a secure communication mechanism between said user and the GRID through integrity and security means integrated in the GRID itself;

the user selecting the video file which must be played back;

the user selecting the quality parameters for transcoding the video file by means of selecting a codec and a resolution;

storing the quality parameters in a JSDL (Job Submission Description Language) file previously generated by the GRID connector module which is a module communicating the GRID middleware with the multimedia application of the device by means of an application interface;

sending a transcoding run request together with the JSDL file to the GRID through the GRID connector module from the user device by means of using Application Programming Interfaces, APIs, included in the GRID middleware;

generating a transcoded video file by means of running the transcoding in the GRID with the parameters stored in the JSDL file;

storing said video file in a GRID user file system;

playing back the video file.

As has been mentioned above, said selection in the video file selection phase is carried out in a mode selected from:

a direct mode, when the video file is stored in the GRID user file system, selecting the file by means of direct access to said system, an indirect mode, when the video file is stored in the network server, selecting the file by indicating its exact location by means of a URL.

In the event that the verification phase obtains as a result that the user is not registered, an additional phase is carried out which comprises the GRID middleware requesting the credentials from the user and performing a process of registering the user in the GRID.

When the phase of selecting the quality for transcoding the video file is carried out, a default option optimising the transcoding parameters for playing it back depending on the given device is provided.

The phase of generating the transcoded video file comprises performing it in a mode selected from:
  when the video file is stored in the GRID user file system, the video file resulting from transcoding is stored in the GRID file system, the GRID file system sending an end of process notification to the transcoding/play back application, the file being available from that moment for play back;
  when the video file is stored in the network server, selecting the file by indicating its exact location by means of a URL, transcoding is performed and at the same time playing back the file is enabled, sending it to the terminal using streaming techniques.

Furthermore, during the phase of verifying that the user is registered in the GRID, the accesses to the GRID user file system and the phase of generating the transcoded video file are done by means of using XtreemOS-MD technology implemented in the GRID middleware.

The phase of storing the quality information in a JSDL file additionally comprises storing information of the process which must be run in the GRID and of the memory and CPU resources necessary for running the transcoding.

On the other hand, the present invention further claims a system comprising the following modules:
  a GRID connector module implemented in the GRID middleware communicating the GRID middleware with the multimedia application of the device by means of an interface, it manages the access to, sending and running of processes in the GRID, determines when a process ends and handles possible errors and incidents occurring during the transcoding process by means of using APIs provided by the GRID middleware,
  a GRID file system connector implemented in the GRID connector module comprising means for managing the list of files and directories located in the GRID user file system and means for the user to select the video file to be transcoded.

The GRID connector module comprises means which allow the user to pause, resume and/or cancel the audio file transcoding process and further comprises means for generating files in JSDL format where the process which must be run in the GRID and the transcoding parameters previously specified by the user are stored.

The main advantages of the present invention with respect to the state of the art are:
  1. It allows multimedia terminals with limited computing power to play back any type of video due to the possibility of carrying out a video transcoding process in the GRID.
  2. It allows running a transcoding application which is specific to each terminal. The GRID therefore does not need to provide a generic transcoding application, which on the other hand adds certain complexity to the GRID since it must determine the type of terminal and its features in order to perform the optimum coding. Having the specific application of the terminal, running the application in the GRID will be sufficient for obtaining the expected result (result suitable for playback in the terminal).
  3. It saves user bandwidth. Given that both the video which is coded and the transcoding task are outside the terminal (i.e., in the GRID), and the user does not need to install any additional application in any other personal device (PC, etc), so there is no need for downloading the original video in the device. The video will be directly coded according to the user needs. Furthermore, in the case of offering a site where the video is stored through a URL, the process of downloading the original video will be carried out by the GRID, not by the user device, saving user bandwidth.
  4. It offers the service infrastructure providers the capacity to deploy services in the terminals of the clients. By using this approach, a service provider will not need to develop complex web interfaces or APIs for each type of multimedia application. On the other hand, the terminal application providers will not need to modify their applications for the use of said Web APIs. Instead, by including GRID middleware in the terminal, most of the application will be ready to be run in the GRID.

DESCRIPTION OF PREFERRED EMBODIMENTS

Figure 1:
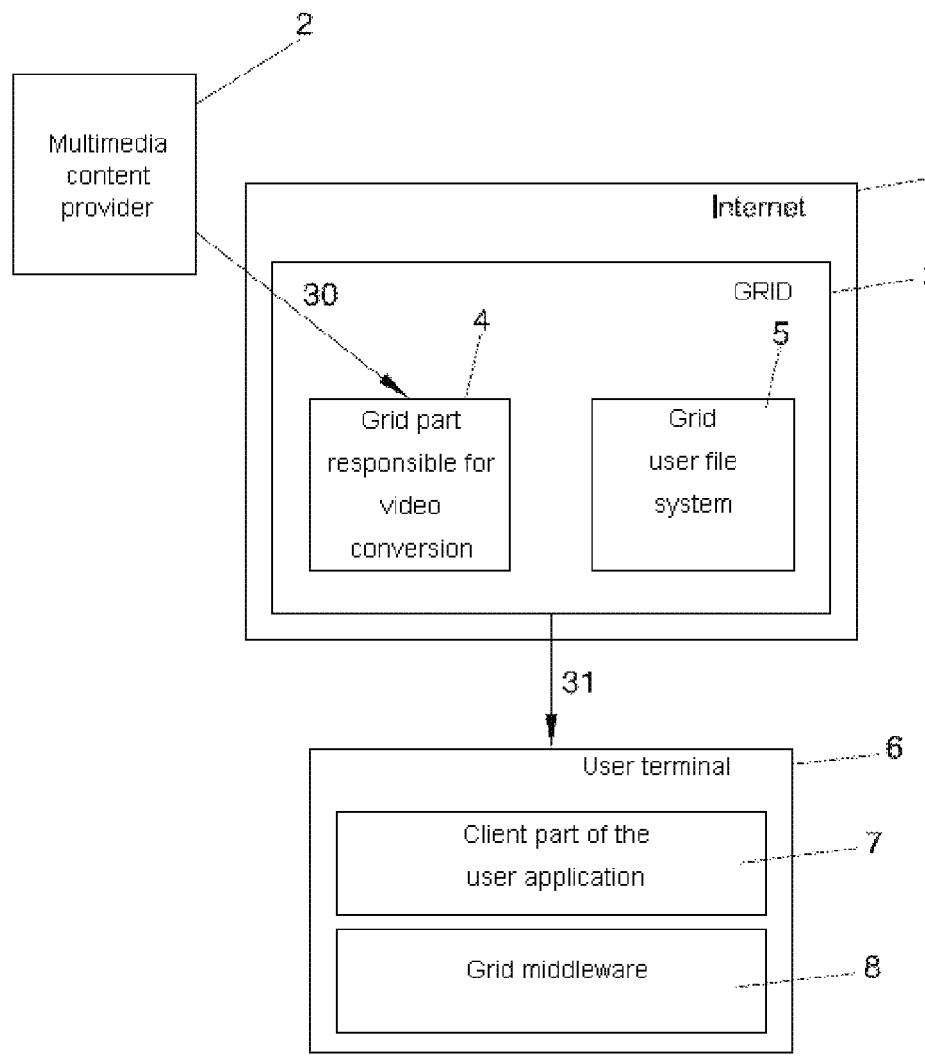
FIG. 1 shows the block diagram of the different modules identified in scenarios 1 and 2.

An embodiment of the invention is described below in an illustrative and non-limiting manner referring to the numbers used in the drawings.

FIG. 1 shows the block diagram of the different modules identified in scenarios 1 and 2, which are the Internet (1), a multimedia contents provider (2), the GRID (3), the GRID part responsible for transcoding video (Scenarios 1 and 2) and video streaming (scenario 2) (4), a GRID user file system (5), a user terminal (6), the client part of the user application for playing back the video (client part of the multimedia transcoder/player) (7) and the middleware, GRID operating system of the user terminal (8).

The user terminal could be a Nokia® N800, for example, which can be considered today as an equipment having low computing capacity, since it has a memory of 256 MB (any PC has more than 1 GB of RAM) and an OMAP 2420 Texas Instruments® processor with a processing capacity of the order of 500 MIPS (millions of instructions per second).

Figure 2:
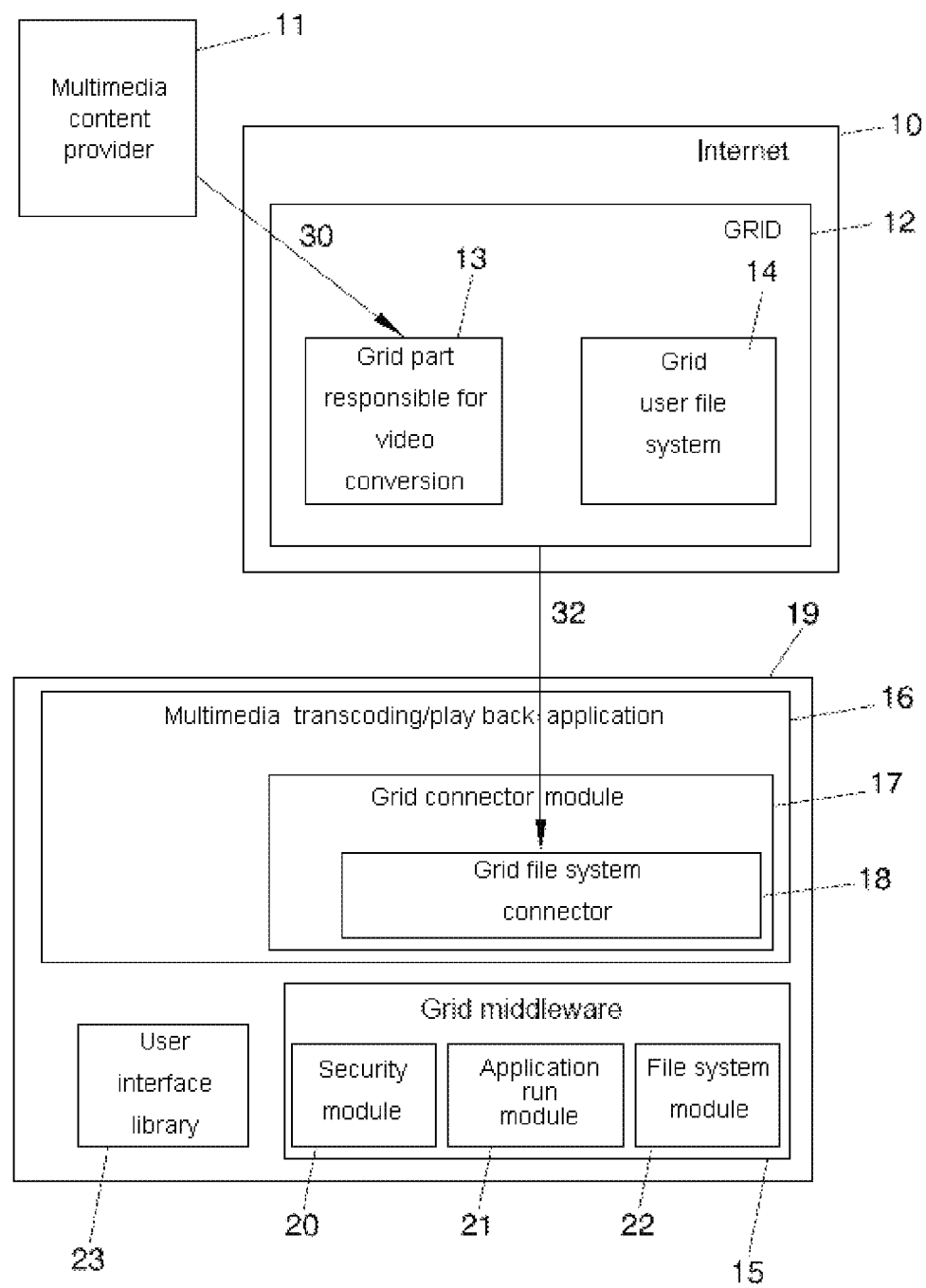
FIG. 2 shows the architecture of the transcoding application where the different modules forming it are shown.

FIG. 2 shows the architecture of the transcoding application, where the different modules and elements forming it are shown, which allows performing video transcoding together with the XtreemOS-MD GRID middleware following the indicated process. The elements shown in the figure are the Internet (10), a multimedia contents provider (11), the GRID (12), the GRID part responsible for transcoding video (Scenarios 1 and 2) and video streaming (scenario 2) (13), a GRID user file system (14), the GRID middleware (15) installed in the user terminal, including the module for GRID authentication (20), module for performing works in the network (21) and for managing and setting up the GRID file system (22), module for the multimedia player application capable of playing back multimedia contents stored in the file system or downloading them by means of streaming (16), a GRID connector module (17) which allows the play back application to control and manage the video transcoding tasks through GRID middleware (15), a GRID system connector module (18) which allows the play back application to select the file which must be played back from the user file system of the GRID (12) and a user terminal (19).

Hereinafter the video transcoding/play back application of the device will be called GPlayer for the sake of simplicity. The GPlayer application (16) provides a user interface which will be run on the user terminal, which will be used by the user to select the video to be transcoded and played back. To start the application, the GRID middleware (15) is run in order to verify that the user has been previously authenticated in the GRID (12). If not, the user credentials will be requested by the middleware, carrying out the registration process in the GRID.

The application (16) uses a GRID connector module (17) for use in the GRID (12) which in turn contains a GRID file system connector (18) accessing the GRID user file system (14) through the GRID middleware (15).

The GRID connector module (17) manages the access and sending of processes to the GRID (12) and controls the run of the transcoding processes, determining when a process has ended and handling the possible errors or incidents which can arise during the transcoding process. The GRID connector module uses the APIs of the GRID middleware.

The application offers the possibility of transcoding and playing back both video files stored in the GRID user file system (Scenario 1), and files which the user does not have direct access to and the location of which is indicated by means of a URL (Scenario 2).

A connector is necessary for scenario 1. This connector is the GRID file system connector (18), a module which is used by the GPlayer application (16) for providing the list with all the files and directories located in the user file system of the GRID (12). This connector allows the user to choose which file from those available in the GRID user file system will be transcoded/played back.

The application will also offer the user the possibility of selecting the desired quality for transcoding video which will be played back from the possible codec and resolution options supplied by the terminal. There will be a default option and, it will generally be the optimum option in terms of playback quality with the given terminal.

The client part of the application (16) will launch a transcoding process run request to the GRID by means of using the APIs offered by GRID middleware (15) once the video file which must be played back and the desired quality are selected.

To that end, the work to be performed in the GRID is specified through a file in JSDL (Job Submission Description Language) format which will be generated by the GRID connector module (17), adding the suitable transcoding parameters according to the options selected by the user.

The JSDL file will indicate that the work to be performed in the GRID (12) is the GRID part of the GPlayer application (16) which could be located in the GRID user file system (14), or if not, they will be copied in said file system before starting its run in the GRID.

Then, the GRID will perform the transcoding task. In scenario 1, the transcoder will have the original video file as input, generating a transcoded video depending on the input parameters indicated in the JSDL file.

The GRID connector module (17) controls that the process is suitably run in the GRID during the transcoding process: if an error were to occur in the process, the GRID connector module (17) will send an error notification to the GPlayer application (16). The GRID connector module (17) also allows the user to pause, resume and/or cancel the transcoding process.

The resulting video is stored in the user distributed file system (14). The client part of the GPlayer application (16) will receive a notification once the transcoding process ended, the playing back of the transcoded video being started. In scenario 2, the application of transcoder downloads the original file from the indicated URL (11), starting the transcoding process and providing the transcoded file which has been generated at the same time using streaming techniques (GPlayer usually only implements scenario 1).

The GPlayer (16) will use the capacities offered by XtreemOS-MD (XtreemOS for mobile devices) implementing the GRID middleware (15) in all cases for carrying out the operations of authenticating the GRID (12), performing work in the GRID (12) and the access to the user file system.

What is claimed is:

1. A method for transcoding and playing back video files based on GRID technology in devices having limited computing power, wherein a transcoding/playback multimedia application and a GRID middleware are previously provided, both integrated in a user device, wherein said method comprises the following steps:
    providing the user device with a user interface for selecting a video file through the transcoding/play back application;
    verifying that the user is registered in the GRID by means of the GRID middleware and establishing a secure communication mechanism between said user and the GRID through integrity and security means integrated in the GRID itself;
    enabling the user to select the video file which must be played back;
    enabling the user to select the quality parameters for transcoding the video file by means of selecting a codec and a resolution;
    storing the user selected quality parameters in a JSDL file which has been previously generated by a GRID connector module which is a module communicating the GRID middleware with the multimedia application of the user device by means of an application interface;
    sending a transcoding run request together with the JSDL file to the GRID through the GRID connector module from the user device by means of using APIs included in the GRID middleware;
    generating a transcoded video file by means of performing the transcoding in the GRID with the parameters stored in the JSDL file;
    storing said video file in a GRID user file system; and
    playing back the video file.

2. A method for transcoding and playing back video files based on GRID technology in devices having limited computing power according to claim 1, wherein in the video file selection phase, said selection is carried out by means of a mode selected from:
    a direct mode, when the video file is stored in the GRID user file system, selecting the file by means of direct access to said system; and,
    an indirect mode, when the video file is stored in the network server, selecting the file by indicating its exact location by means of a URL.

3. A method for transcoding and playing back video files based on GRID technology in devices having limited computing power according to claim 1, wherein in the event that the verification phase obtains as a result that the user is not registered, an additional phase is carried out which comprises the GRID middleware requesting the credentials from the user and performing a process of registering said user in the GRID.

4. A method for transcoding and playing back video files based on GRID technology in devices having limited computing power according to claim 1, wherein the phase of selecting the quality for transcoding the video file comprises an option for optimizing the transcoding parameters depending on the given device.

5. A method for transcoding and playing back video files based on GRID technology in devices having limited computing power according to claim 1, wherein the phase of generating the transcoded video file comprises carrying it out by means of a mode selected from:

when the video file is stored in the GRID user file system, the video file resulting from transcoding is stored in the GRID file system, the GRID file system sending an end of process notification to the transcoding/play back application, the file being available from that moment for play back; and, when the video file is stored in the network server, selecting the file by indicating its exact location by means of a URL, transcoding is performed and at the same time playing the file back is enabled, sending it to the terminal using streaming techniques.

6. A method for transcoding and playing back video files based on GRID technology in devices having limited computing power according to claim 1, wherein the phase of verifying that the user is registered in the GRID, the accesses to the GRID user file system and the phase of generating the transcoded video file are carried out by means of using XtreemOS-MD technology implemented in the GRID middleware.

7. A method for transcoding and playing back video files based on GRID technology in devices having limited computing power according to claim 1, wherein the phase of storing the quality information in a JSDL file additionally comprises storing information of the process which is run in the GRID and of the memory and CPU resources necessary for performing the transcoding.

8. A system for transcoding and playing back video files based on GRID technology in devices having limited computing power, wherein a multimedia application for transcoding and play back and a GRID middleware are previously provided, both integrated in a user device, wherein said system comprises:

a GRID connector module implemented in the GRID middleware, the GRID connector module allowing communication between the GRID middleware and the multimedia application of the user device with an application interface, the GRID connector module being configured to manage the access to, sending and running of processes in a GRID, and being configured to determine when a process ends and handles possible errors and incidents occurring during the transcoding process through APIs provided by the GRID middleware, and a GRID file system connector implemented in the GRID connector module that manages a list of files and directories located in a GRID user file system;

wherein the multimedia application is configured to enable the user to select a video file to be transcoded and configured to enable the user to select quality parameters for transcoding the video file through selection of a codec and a resolution, and wherein the GRID connector module stores the user's selected video file and user's selected parameters for transcoding in a file for dispatch to the GRID along with a request for transcoding and wherein the file is in JSDL format and the GRID connector module generates files in JSDL format to include user selected transcoding parameters, the transcoding parameters including process which is run in the GRID, video resolution, number of images per second (frame rate) and codec.

9. A system for transcoding and playing back video files based on GRID technology in devices having limited computing power according to claim 8, wherein the GRID connector module is configured to enable the user to carry out an action selected from pausing, resuming and cancelling an audio file transcoding process.

\* \* \* \* \*